(12) United States Patent
Takamizawa et al.

(10) Patent No.: US 9,442,740 B2
(45) Date of Patent: Sep. 13, 2016

(54) DATA WRITING METHOD AND DATA WRITING DEVICE

(75) Inventors: Yuji Takamizawa, Suwa (JP); Naohiko Koakutsu, Suwa (JP); Akio Takamoto, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 691 days.

(21) Appl. No.: 13/433,971

(22) Filed: Mar. 29, 2012

(65) Prior Publication Data
US 2012/0254487 A1    Oct. 4, 2012

(30) Foreign Application Priority Data

Apr. 1, 2011 (JP) .................................. 2011-081737

(51) Int. Cl.
 *G06F 13/12* (2006.01)
 *G06F 13/38* (2006.01)
 *G06F 9/44* (2006.01)

(52) U.S. Cl.
 CPC .................................. *G06F 9/4411* (2013.01)

(58) Field of Classification Search
 None
 See application file for complete search history.

(56) References Cited

U.S. PATENT DOCUMENTS

| | | | |
|---|---|---|---|
| 4,511,967 A * | 4/1985 | Witalka et al. ................... 710/1 |
| 5,274,818 A * | 12/1993 | Vasilevsky et al. .......... 717/149 |
| 5,297,268 A * | 3/1994 | Lee et al. ....................... 711/164 |
| 5,323,393 A | 6/1994 | Barrett et al. | |
| 5,644,609 A * | 7/1997 | Bockhaus et al. .............. 377/64 |
| 5,841,991 A | 11/1998 | Russell | |
| 6,244,762 B1 | 6/2001 | Fukano et al. | |
| 6,404,820 B1 * | 6/2002 | Postol ........................... 375/259 |
| 7,356,580 B1 * | 4/2008 | Huang et al. ................. 709/224 |
| 7,383,431 B2 | 6/2008 | Takamizawa et al. | |
| 7,620,821 B1 * | 11/2009 | Grohoski et al. ............. 713/189 |
| 7,870,299 B1 * | 1/2011 | Sorensen et al. ................ 710/2 |
| 2002/0138712 A1 * | 9/2002 | Yoshida ........................ 712/205 |
| 2003/0038842 A1 * | 2/2003 | Peck et al. ..................... 345/763 |
| 2004/0267857 A1 * | 12/2004 | Abel et al. ..................... 708/524 |
| 2005/0122790 A1 * | 6/2005 | Ueno et al. .............. 365/189.05 |
| 2006/0079970 A1 * | 4/2006 | Ward ............................... 700/86 |
| 2006/0178757 A1 * | 8/2006 | Grgic et al. ....................... 700/9 |
| 2008/0274689 A1 * | 11/2008 | Kuban ............................... 455/7 |
| 2012/0221539 A1 * | 8/2012 | Rose et al. .................... 707/706 |
| 2012/0236352 A1 * | 9/2012 | Amano .............. H04N 1/00204 358/1.13 |

FOREIGN PATENT DOCUMENTS

| | | |
|---|---|---|
| JP | 06-214926 A | 8/1994 |
| JP | 2000-141830 A | 5/2000 |

(Continued)

*Primary Examiner* — Henry Tsai
*Assistant Examiner* — Christopher Bartels
(74) *Attorney, Agent, or Firm* — Kilpatrick Townsend & Stockton LLP

(57) ABSTRACT

A host device requests a recording device to send first information including model information or sequel information expressed as a value in a first range. The host device determines if the model information or the sequel information is contained in the first information sent from the recording device, and acquires the model information from the first information if the model information is contained in the first information. If the sequel information is contained in the first information, the host device requests transmission of second information containing model information expressed as a value in the second range, and acquires model information from the second information. Based on the acquired recording device model information, the host device writes data stored in the host device to the recording device.

16 Claims, 5 Drawing Sheets

(56) References Cited

FOREIGN PATENT DOCUMENTS

| JP | 2001-018490 A | 1/2001 |
| JP | 2004-185635 A | 7/2004 |
| JP | 2005-085121 A | 3/2005 |
| JP | 2008-117404 A | 5/2008 |
| JP | 4250535 B2 | 1/2009 |

* cited by examiner

FIG. 6A

First Header Record:
- BIT INVERSION
- 2-BIT RIGHT CIRCULAR SHIFT
- 2-BIT LEFT CIRCULAR SHIFT
- DETERMINED (FIRST RANGE)

FIG. 6B

Second Header Record:
- First Area Data:
  - 2-BIT LEFT CIRCULAR SHIFT
  - 2-BIT RIGHT CIRCULAR SHIFT
  - BIT INVERSION
  - SEQUEL REPORT BIT SEQUENCE (FIRST RANGE)
- Second Area Data:
  - MODEL ID (SECOND RANGE)

ND DATA
DATA WRITING METHOD AND DATA WRITING DEVICE

BACKGROUND

1. Technical Field

The present invention relates to technology for writing data to a device.

2. Related Art

Devices such as printers and other peripheral devices are generally used connected to a management device used as a host device. The host controls a particular peripheral device according to the type of peripheral device that is connected to the host. As a result, the host must get the identification information (a model ID) assigned to the peripheral device before the peripheral device can be controlled. Note that the model ID is identification information representing a value that uniquely identifies the model of a particular device.

Technology enabling the host to acquire the identification information assigned to peripheral devices is taught in Japanese Unexamined Patent Appl. Pub. JP-A-2004-185635, for example. This technology is described below. First, an information processing device broadcasts a request for the identifier of each network-compatible peripheral device. The peripheral devices then respond to this broadcast using an ID number or device type information, for example.

Based on the acquired model IDs, the host looks for data and a control program for the peripheral. Technology that performs a specific bit operation on the acquired model ID, and compares the result with a known bit string that is already correlated to the data and control program, is used to confirm a correlation and prevent search errors.

However, the length (data length) of the model ID assigned to each peripheral device is generally fixed, and the range of numbers that can be used as a model ID is therefore limited. For example, if the model ID is 7 bits long, the range of numbers that can be used as a model ID is 0 to 127. While this enables assigning a new model ID to 128 models, new model IDs cannot be assigned if there are 129 models or more. If a model ID is assigned to a new model using a new format with a longer model ID, the format of the model ID will differ between new models and old models. Such different formats can lead to model ID recognition errors by the host device. When the correlation to a particular device is checked with a bit operation as described above, format differences are likely to produce recognition errors, and cause problems when overwriting the firmware or other control program for a peripheral device based on the model ID. In addition, in order to individually accommodate different formats, the configuration of both devices with different formats must generally be changed, thus increasing the burden on the product designer and system administrator.

SUMMARY

The present invention provides technology enabling assigning model information (model ID numbers) in a new range of values, reliably checking the correlation between model ID and data, and reliably rewriting data in the peripheral device.

One aspect of the invention is a data writing method that a host device uses to write data to a recording device, including: a step of a host device requesting the recording device to send information including the recording device model information or sequel information in a first format; a step of the host device determining based on the information received from the recording device in the first format if the sequel information is contained in the information received in the first format; a step of the host device acquiring the model information from the information received in the first format when the sequel information is not contained in the information received in the first format, and determining by a first method the correlation between the model information and model information contained in recording device control data stored by the host device; a step of the host device requesting the recording device to send the sequel information in a second format that differs from the first format when the sequel information is contained in the information received in the first format; a step of the host device acquiring the model information from the information received in the second format from the recording device, and evaluating the correlation between the model information and the control data using a second method that differs from the first method; and a step of the host device writing the control data to the recording device based on the correlation determined by the first method or the second method.

In a data writing method according to another aspect of the invention, the first method and the second method are methods of determining if the result of a specific bit conversion of information received in the first format is a specific value, and the result of bit conversion of an information obtained by the first method is different from the result of bit conversion of the information obtained by the second method.

In a data writing method according to another aspect of the invention, the first method and the second method are methods that apply plural different bit conversions to the information received in the first format, and determine if the results arranged in a specific order equal a specific value, and the bit conversions or ordering sequences performed in the first method and the second method are different.

In a data writing method according to another aspect of the invention, in the step of writing the control data to the recording device, the host device writes the control data to the recording device when model information received in the first format from the recording device and the model information contained in the recording device control data stored by the host device match in the first method, and when model information received in the second format from the recording device and the model information contained in the recording device control data stored by the host device match in the second method.

Another aspect of the invention is a data writing device that can connect to a recording device, including: a request unit that requests the recording device to send information including the recording device model information or sequel information in a first format; a sequel information evaluation unit that determines based on the information received from the recording device in the first format if the sequel information is contained in the information received in the first format; a first method evaluation unit that acquires the model information from the information received in the first format when the sequel information is not contained in the information received in the first format, and determines by a first method the correlation between the model information and model information contained in recording device control data stored by the host device; a second format request unit that requests the recording device to send the sequel information in a second format that differs from the first format when the sequel information is contained in the information received in the first format; a second method evaluation unit that acquires the model information from the information received in the second format from the recording device, and evaluating the correlation between the model information and the control data using a second method that differs from the first method; and a write unit that writes the control data to the recording device based on the correlation determined by the first method or the second method.

Another aspect of the invention is a write program that is executed by a control unit of a host device capable of connecting to a recording device, the program causing the control unit to function as: a request unit that requests the recording device to send information including the recording device model information or sequel information in a first format; a sequel information evaluation unit that determines based on the information received from the recording device in the first format if the sequel information is contained in the information received in the first format; a first method evaluation unit that acquires the model information from the information received in the first format when the sequel information is not contained in the information received in the first format, and determines by a first method the correlation between the model information and model information contained in recording device control data stored by the host device; a second format request unit that requests the recording device to send the sequel information in a second format that differs from the first format when the sequel information is contained in the information received in the first format; a second method evaluation unit that acquires the model information from the information received in the second format from the recording device, and evaluating the correlation between the model information and the control data using a second method that differs from the first method; and a write unit that writes the control data to the recording device based on the correlation determined by the first method or the second method.

The invention enables assigning model information (model ID) in a new range of values, and accurately determining a correlation between model information and data.

BRIEF DESCRIPTION OF THE DRAWINGS

FIG. 6 shows a specific example of a header record.

DESCRIPTION OF EMBODIMENTS

Figure 1:
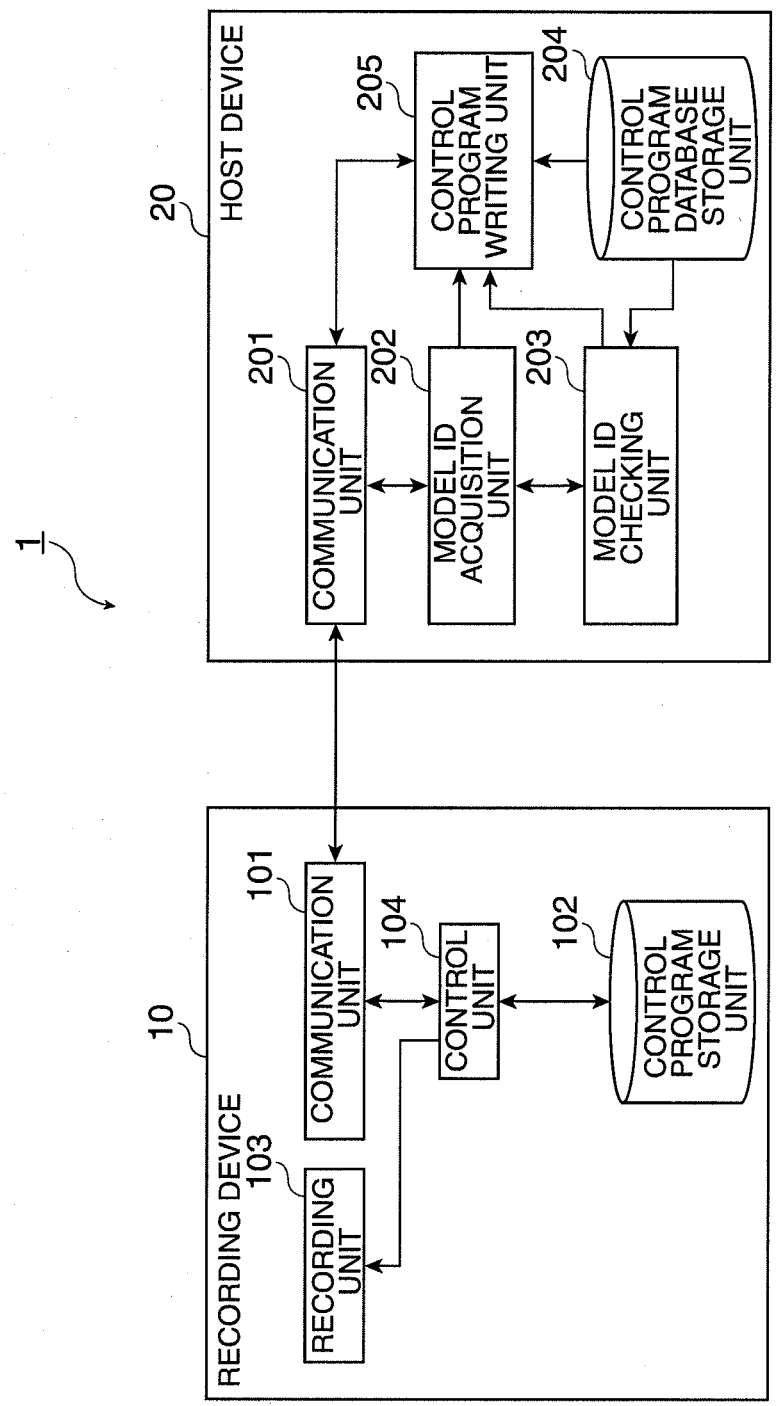
FIG. 1 is a block diagram showing the configuration of a recording system 1.

FIG. 1 shows the configuration of a recording system 1 according to a preferred embodiment of the invention. The recording system 1 is described briefly first.

The recording system 1 includes a recording device 10 and a host device 20. The recording device 10 and host device 20 are both capable of two-way communication. The host device 20 has a control program for the recording device 10 that also enables upgrading the recording device 10. A model ID is assigned to the recording device 10, and the host device 20 finds the control program compatible with the recording device 10 based on the model ID. The host device 20 sends the found control program to the recording device 10, and rewrites the control program in the recording device 10. The model ID is identification information identifying the model of the recording device 10. A unique model ID is assigned to each model of recording device 10.

The recording device 10 operates according to the control program (firmware) stored in a control program storage unit 102. The recording device 10 records numbers and data on a recording medium according to commands received from the host device 20 and commands input directly to the recording device 10 by the user. The recording device 10 could be a printer that uses paper or other sheet medium as the recording medium, and prints on the recording medium using an ink ribbon or ink stored in an ink tank, for example. The recording device 10 could also be a scanner that uses a magnetic hard disk drive or semiconductor memory device as a recording medium, reads text and images from the paper, and records to the recording medium. When configured as a scanner, the recording device 10 is not required to have a storage device as a recording medium, and could be built to transmit the read data to the host device 20. In this case a storage device disposed to the host device 20 is the recording medium to which the data is recorded. This recording process is performed by the recording unit 103.

The host device 20 acquires the model ID assigned to the recording device 10 from the recording device 10, and looks for the control program for the recording device 10 based on the model ID. The host device 20 then sends the found control program to the recording device 10, and rewrites the control program. The host device 20 could be configured using a personal computer, smartphone, or other general purpose information processing device, or it could be configured using an information processing device dedicated to a specific application such as a POS (point of sale system) terminal.

The data that the host device 20 checks for compatibility with the model ID acquired from the recording device 10 is the control program in this embodiment of the invention. However, the data that is checked for compatibility with this model ID is not limited to a control program, and could be other data. For example, this data could be data that is printed by the recording device 10, or control information for printing by the recording device 10 (such as the size of margins or the text font).

These devices are described in detail below.

The recording device 10 has a CPU (central processing unit), memory, and auxiliary storage devices connected by a bus, and executes a control program. By executing the control program, the recording device 10 functions as a device having a communication unit 101, control program storage unit 102, recording unit 103, and control unit 104. Note that all or part of the functions of the recording device 10 can be performed using such hardware as an ASIC (application specific integrated circuit), PLD (programmable logic device) or FPGA (field programmable gate array) device. The control program may be stored on a recording medium that is readable by a computer. The computer-readable recording medium could be a floppy disk, magneto-optical disc, ROM, CD-ROM or other removable media, or a recording device such as a hard disk drive that is built into a computer system.

The communication unit 101 communicates with the host device 20 by wired or wireless communication to send and receive data. Examples of wired communication include using a LAN (Local Area Network), RS-232C (Recommended Standard 232 version C), or USB (Universal Serial Bus) cable. Examples of wireless communication include a wireless LAN, infrared communication, or Bluetooth.

The control program storage unit 102 is configured using a storage device such as a magnetic hard disk drive or semiconductor memory device. The control program storage unit 102 stores the control program enabling the control unit 104 to operate. The control program stored by the control program storage unit 102 is overwritten by the control unit 104 as controlled by the host device 20.

The recording unit 103 records. More specifically, the recording unit 103 records numbers and data on the recording medium according to commands received from the host device 20 or commands input to the recording device 10 directly by the user.

The control unit 104 operates according to the control program stored by the control program storage unit 102.

The host device 20 has a CPU, memory, and auxiliary storage devices connected by a bus, and executes a management program. The host device 20 functions as a device having a communication unit 201, model ID acquisition unit 202, model ID checking unit 203, control program database storage unit 204, and control program writing unit 205 by executing the management program. Note that all or part of the functions of the host device 20 can be performed using such hardware as an ASIC, PLD or FPGA device. The management program may be recorded on a computer-readable recording medium.

The communication unit 201 communicates with the recording device 10 by wired or wireless communication to send and receive data. Examples of wired communication include using a LAN, RS-232C, or USB cable. Examples of wireless communication include using a wireless LAN, infrared communication, or Bluetooth.

The model ID acquisition unit 202 gets the model ID of the recording device 10 by communicating with the recording device 10. The model ID acquisition unit 202 also acquires the model ID of the recording device 10 based on the second response information when second response information is received from the recording device 10 in response to a second response request from the recording device 10. Specific steps in this process are described below.

The model ID checking unit 203 checks the correlation between the model ID acquired by the model ID acquisition unit 202, and the control program stored in the control program database storage unit 204 for that model ID.

The control program database storage unit 204 is rendered using a storage device such as a magnetic hard disk drive or semiconductor memory device. The control program database storage unit 204 stores a control program corresponding to the model of the recording device 10 related to data (header record) for checking the correlation between the model ID and the control program.

The control program writing unit 205 reads the control program for which the model ID correlation was confirmed by the model ID checking unit 203 from the control program database storage unit 204. The control program writing unit 205 then sends the read control program to the recording device 10, and updates the control program stored in the control program storage unit 102 of the recording device 10.

Figure 2:
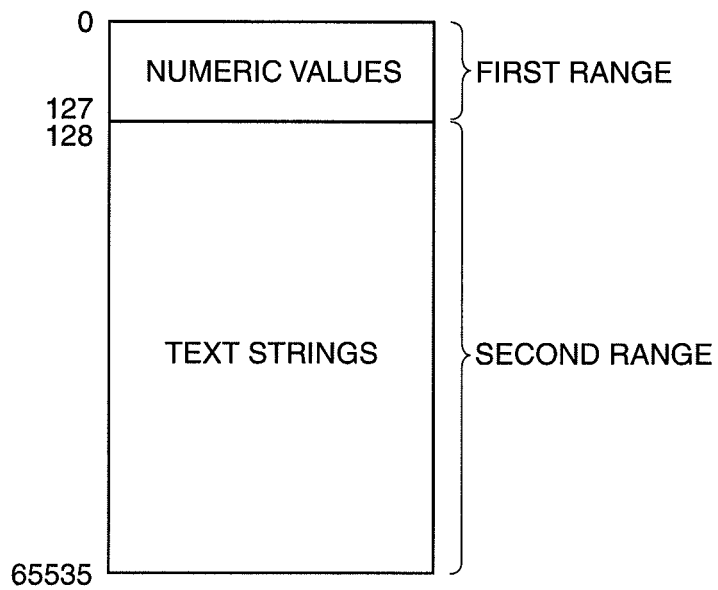
FIG. 2 describes the model ID in detail.

FIG. 2 describes the model ID. The model ID is described in detail next using FIG. 2.

There are at least two ranges of values for the model ID. One of these value ranges is referred to below as a first range, and the other as a second range. The second range stores values in a broader range that does not overlap the first range. The recording devices 10 include devices with a model ID assigned in the first range, and devices with a model ID assigned in the second range. The recording devices 10 to which a model ID in the first range is assigned are, for example, devices with an older manufacturing date than recording devices 10 having a model ID in the second range. In this embodiment, therefore, a recording device 10 with a model ID in the first range is an older model of device, and a recording device 10 with a model ID in the second range is a new device model. The first range is a range of values that can be expressed with 7 bits, that is, the range 0 to 127. The second range of values, which are outside this first range, is 128 to 65,535, that is, the range of 16-bit values not including the lower 7 bits. These ranges are simply one example, and different ranges may be used.

The model ID is expressed by a numeric value whether it is a value in the first range or a value in the second range. Model IDs in the first range and model IDs in the second range are common in this respect. However, different data formats are used when sending these model IDs from the recording device 10 to the host device 20. Model IDs in the first range are communicated using a data format expressed with numbers. Model IDs in the second range are communicated using a data format expressed by a text string.

Figure 3:
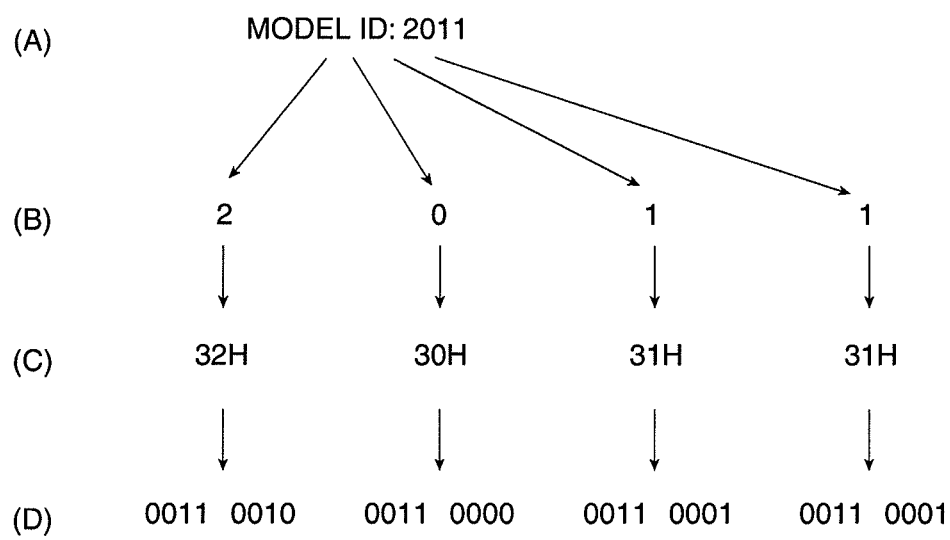
FIG. 3 describes a specific example of the data format when a model ID contained in a second range is sent from a recording device 10 to a host device 20.

FIG. 3 shows an example of the data format used to send a model ID in the second range from the recording device 10 to the host device 20. A model ID of 2011 expressed as a text string is used for example in FIG. 3. FIG. 3 (A) shows the letters in the model ID. FIG. 3 (B) shows the individual letters in the model ID. As shown in FIG. 3 (B), the value of each digit of the model ID is acquired as a letter. FIG. 3 (C) shows the hexadecimal value of the character code for each digit of the model ID. As shown in FIG. 3 (C), the letter for the value of each digit of the model ID is converted to a character code. Hexadecimal ASCII codes are used as the character codes in FIG. 3 (C). The character codes are not limited to ASCII codes, however. FIG. 3 (D) shows the binary bit sequence of the character code for each digit. As shown in the figure, model IDs contained in the second range are sent as text strings from the recording device 10 to the host device 20.

Figure 4:
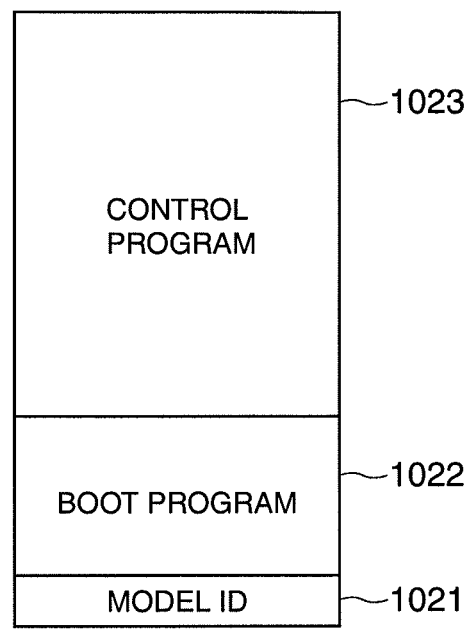
FIG. 4 describes the format of data stored to the control program storage unit 102.

FIG. 4 shows the configuration of the data stored in the control program storage unit 102 of the recording device 10. The storage area of the control program storage unit 102 includes a model ID field 1021, boot program field 1022, and a control program field 1023. The model ID assigned to the recording device 10 is written to the model ID field 1021. The code of the boot program that is read by the control unit 104 when the recording device 10 boots up to write the control program, for example, is written to the boot program field 1022. The code of the control program for normal printing operations, for example, is written to the control program field 1023.

When a specific switch of the recording device 10 is pressed and the power turns on, the control unit 104 enters a special mode for writing the control program, accesses the boot program field 1022, and reads and runs the boot program stored in the boot program field 1022. When a request for the model ID is received from the host device 20, the control unit 104 reads and sends the model ID from the model ID field 1021 to the host device 20. The control unit 104 then writes to the control program field 1023 when the control program is sent from the host device 20.

Figure 5:
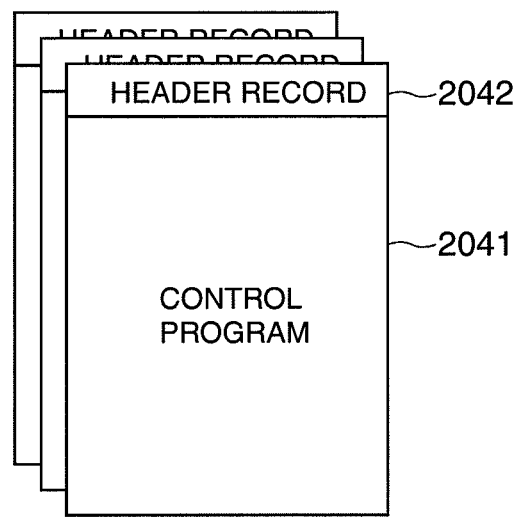
FIG. 5 describes the format of data stored to the control program database storage unit 204.

FIG. 5 shows the structure of data generated by the host device 20 and stored in the control program database storage unit 204. The storage area of the control program database storage unit 204 is prepared for each model ID. The data stored in the control program database storage unit 204 include a control program field 2041 and a header record field 2042 for each model ID. The control program field 2041 and header record field 2042 are linked to each other. The control program code is written to the control program field 2041. A header record corresponding to each control program is written to the header record field 2042. A header record is data for confirming the correlation between the control program and model ID, or is the model ID information.

FIG. 6 shows a specific example of a header record. FIG. 6A shows a header record ("first header record") for a control program written for a recording device 10 with a model ID in the first range. FIG. 6B shows a header record ("second header record") for a control program written for a recording device 10 with a model ID in the second range. Data for confirming a correlation between the control program and model ID using a first method is written to the first header record. Data for confirming a correlation between the control program and model ID using a second method is written to the second header record. The second header record includes first area data, which is data for confirming the control program and model ID correlation using the second method, and second area data to which a model ID in the second range is assigned.

The first header record has four blocks of 8 bits each. Of the four blocks, three blocks contain bit sequences obtained by bit converting the model ID. The first block (at the left end in the figure) stores a bit sequence obtained by bit inverting the bit sequence of a model ID in the first range, which is recorded to the last block (at the right end in the figure). A bit sequence obtained by a 2-bit right circular shift of the model ID is recorded to the second block (the second from left end). A bit sequence obtained by a 2-bit left circular shift of the model ID is recorded to the third block (the third from left end). The original bit sequence of the model ID is recorded to the last block (at the right end).

The method of confirming a correlation using the first method is described next. First, the host device 20 sends a model ID request to the recording device 10, and a recording device 10 with a model ID in the first range returns a model ID in the first range. The host device 20 applies a bit inversion, 2-bit right circular shift, and 2-bit left circular shift as shown in FIG. 6A to the model ID, and gets the resulting bit sequence. The bit sequence is then assembled from left to right in the order: bit inversion, 2-bit right circular shift, 2-bit left circular shift, model ID. The assembled bit sequence is then compared with the bit sequence recorded in the first header record of the data stored in the control program database storage unit 204, and a correlation is confirmed if the bit sequences match. If the bit sequences do not match, the values are confirmed to not correlate.

The method of confirming a correlation using the second method is described next.

As shown in FIG. 6B, the first area data of a second header record has four blocks of 8 bits each. Of the four blocks, three blocks contain bit sequences obtained by bit converting a sequel report bit sequence. Because the sequel report bit sequence which indicates the model ID is in the second range is recorded in the fourth block (fourth from left end). The first block (at the left end) stores a bit sequence obtained by a 2-bit left circular shift of the sequel report bit sequence. The bit sequence obtained by a 2-bit right circular shift of the sequel report bit sequence is recorded to the second block (the second from left end). The bit sequence obtained by a bit inversion of the sequel report bit sequence is recorded to the third block (the third from left end). The sequel report bit sequence is recorded directly to the fourth block (fourth from left end).

The sequel report bit sequence is a bit sequence of a value indicating that the value of the model ID of the device (recording device 10) is in the second range, and is the bit sequence the recording device 10 sends to the host device 20 in response to a model ID request received from the host device 20. The sequel report bit sequence is a value in a first range identically to a model ID in the first range. A bit sequence for the model ID in the second range is stored in the second range data following the first range data.

The host device 20 first sends a model ID request to the recording device 10, and the recording device 10 returns the sequel report bit sequence in the first range. The host device 20 applies a 2-bit left circular shift, 2-bit right circular shift, and bit inversion to the sequel report bit sequence, and gets the resulting bit sequence. The bit sequences are then assembled from left to right in the order: 2-bit left circular shift, 2-bit right circular shift, bit inversion, sequel report bit sequence. If the assembled bit sequence and the sequel report bit sequence match, there is a correlation and a model ID in the second range is confirmed. After thus confirming a model with a model ID in the second range, the host device 20 could send the second response request to the recording device 10 to get the model ID in the second range from the recording device 10. If the values do not match, there is not a correlation and it is confirmed that the model ID is not in the second range.

Therefore, when a model ID request (first response request) is sent from the host device 20 to the recording device 10, data with a bit sequence in the first range is first returned from the recording device 10 whether the model ID is in the first range or the model ID is in the second range. As a result, the new control program writing unit 205 can be made compatible with old recording devices 10 that are only compatible with a model ID in the first range, and new recording devices 10 that are only compatible with a model ID in the second range. Because the sequel report bit sequence is a special value, the control program writing unit 205 can be compatible with the model ID assembly rules for both new recording devices 10 and old recording devices 10.

The control program writing unit 205, recording device 10, and the rewritten control program that is the data stored in the control program database storage unit 204 could be combinations of new and old. Data can be rewritten normally as described above with combinations of old parts compatible with a model ID in the first range, and combinations of new parts compatible with a model ID in the second range. Data will not be mistakenly written with other combinations because there will be a mismatch between the first range model ID or first header record of the rewritten control program, or the sequel report bit sequence in the first range, and the recording device 10 model ID or sequel report bit sequence in the first range, and the reassembly order of the control program writing unit 205.

Even if the same value as the sequel report bit sequence is assigned to a model ID in the first range, the order of the first header record including the model ID in the first range as shown in FIG. 6A, and the first range data of the second header record including the sequel report bit sequence as shown in FIG. 6B, will differ, and writing errors can be avoided.

Figure 7:
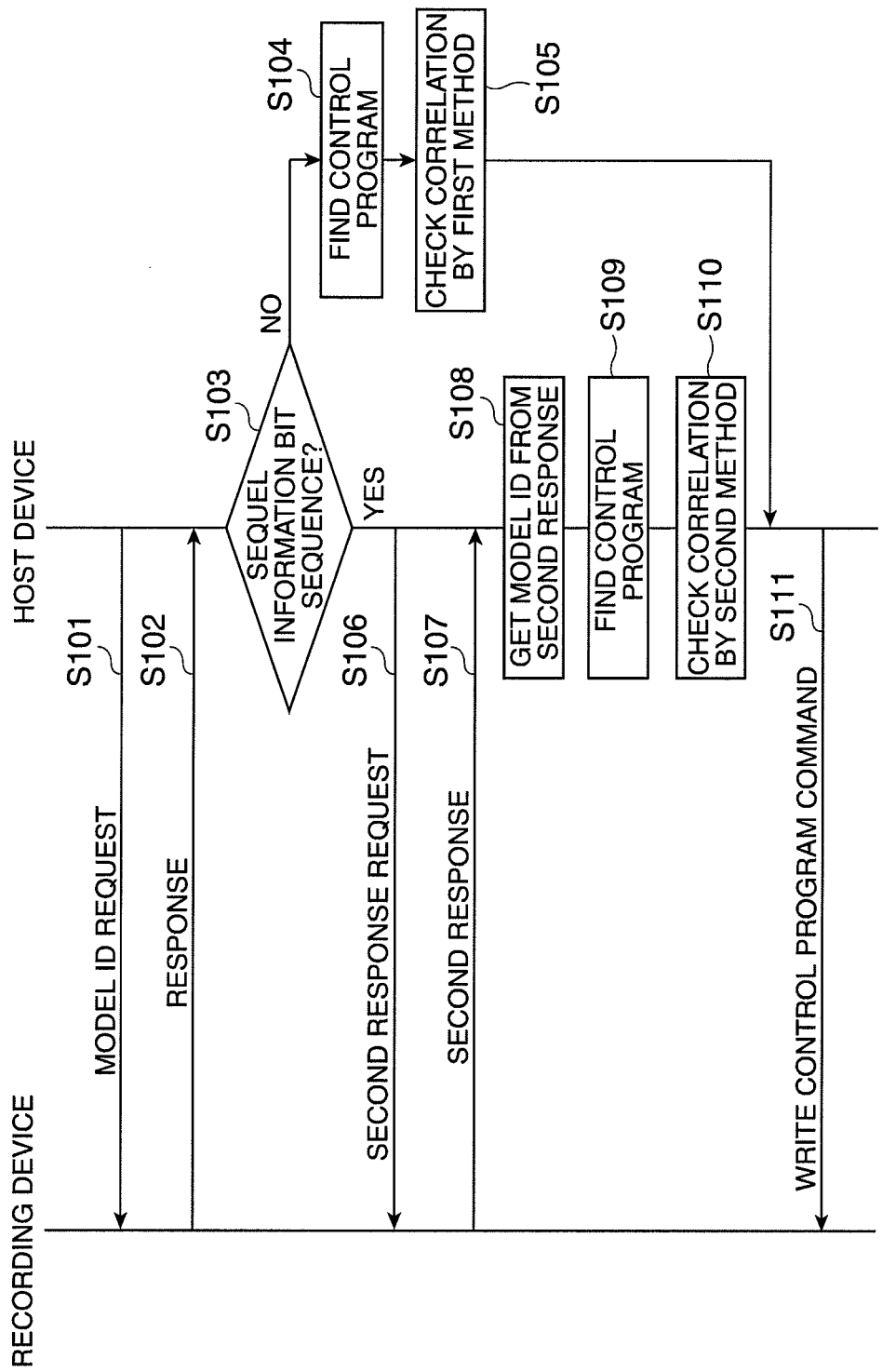
FIG. 7 is a flow chart of the process whereby the host device 20 rewrites the control program in the recording device 10.

FIG. 7 is a flow chart showing a process whereby the host device 20 of the recording system 1 rewrites the control program in the recording device 10. First, the model ID acquisition unit 202 of the host device 20 sends a model ID request to the recording device 10 (step S101). The model ID request is data requesting transmission of the model ID to the host device 20. The model ID request is expressed by a code predefined by the recording device 10 and host device 20. The model ID request is a code used with an older model of a recording device 10 to which a model ID in the first range is assigned, and is a code that can also be used with a new model of recording device 10 to which a model ID in the second range is assigned. The model ID request is a code that is already used with old models (recording devices 10 having a model ID in the first range). As a result, there is no need to change the format of the model ID request on old models.

When a model ID request is received, the control unit 104 of the recording device 10 sends a response (step S102). The response information sent from the recording device 10 to the host device 20 is written in the common format of the first range regardless of whether the model ID assigned to the recording device 10 is in the first range or second range. More specifically, if the model ID is in the first range, the model ID information composed of the four blocks from the left in FIG. 6A is sent as a 1-byte response, and if the model ID is in the second range, the sequel report bit sequence information composed of the four blocks from the left, which are in the first range, in FIG. 6B is sent. Like the model ID request described above, the response is expressed using a format already used by old models. As a result, there is no need to change the format of the response information on old models.

The values contained in the response differ according to whether the model ID is in the first range or the model ID is in the second range. The control unit 104 of a recording device 10 with a model ID in the first range reads the numeric value of the model ID from the model ID field 1021 of the control program storage unit 102, and includes that value as the model ID in the response. For example, if the model ID is 127, the control unit 104 inserts the binary bit sequence 1111111 in the model ID field of the response. The model ID field is an area of a fixed-length bit sequence for inserting the model ID in the bit sequence representing the response.

The control unit 104 of a recording device 10 with a model ID in the second range inserts a bit sequence (sequel report bit sequence) indicating that the model ID of the recording device 10 is in the second range in the model ID field of the response. This sequel report bit sequence is a bit sequence for a special value that is not currently used as a model ID in the first range. For example, the sequel report bit sequence could be a bit sequence representing the value 10H. In other words, the sequel report bit sequence is a bit sequence telling the host device 20 that there is more information (second response information, model ID in the second range) following transmission of the response.

When the response information is received, the model ID acquisition unit 202 of the host device 20 reads the bit sequence of the model ID field in the received response information, and determines if the value of the model ID is the sequel report bit sequence (step S103). If the value in the model ID field is not the sequel report bit sequence (step S103 returns No), the model ID acquisition unit 202 outputs the value in the model ID field directly as the model ID value.

Based on the value of the model ID output by the model ID acquisition unit 202, the model ID checking unit 203 searches the control program database storage unit 204 for a first header record and control program combination that matches the value of the model ID block (step S104). Next, the model ID checking unit 203 determines the correlation between the model ID and the first header record using the first method (step S105). If a match between the model ID sent from the recording device 10 and the first header record that was found is confirmed, the control program writing unit 205 sends the control program from the first header record to the recording device 10 using a specific communication method, and rewrites the control program (step S111).

If the value from the model ID field in the response matches the sequel report bit sequence in step S103 (step S103 returns Yes), the model ID acquisition unit 202 sends the second response request to the recording device 10 (step S106). This second response request is data requesting transmission of second response information to the host device 20. The second response information is data including a model ID in the second range. Because the second response request is sent only to recording devices 10 with a model ID in the second range, a recording device 10 with a model ID in the first range can be incapable of processing the second response request with no particular problem resulting. As a result, older models of devices do not need to be modified to handle the second response request.

The control unit 104 of the recording device 10 receives the second response request and returns second response information (step S107). The second response information sent from the recording device 10 to the host device 20 is written in a format defined for a recording device 10 having a model ID assigned in the second range. The second response information has a variable-length model ID text field. A bit sequence containing the character code of each digit in the model ID in the same sequence as the digits of the model ID is inserted to the model ID text field.

More specifically, the control unit 104 reads the model ID from the model ID field 1021 of the control program storage unit 102, and generates the second response by generating character codes according to the model ID that was read and inserting the character codes to the model ID text field. The control unit 104 then sends the second response information to the host device 20. At this time the control unit 104 inserts a specific value signaling the end of the second response information to the end of the second response. The null value 00H, for example, could be inserted to the end. By inserting this specific value to the end of the second response information, the host device 20 can accurately recognize the end of the model ID text field and the end of the second response even when the model ID text field has a variable length.

When the second response information is received, the model ID acquisition unit 202 of the host device 20 converts the second response information to acquire the numeric value of the model ID (step S108). More specifically, the model ID acquisition unit 202 extracts the value in the model ID text field from the second response information, and acquires the number of each digit of the model ID by recognizing the character codes. The model ID acquisition unit 202 then acquires the numeric value of the model ID by a data conversion operation that assembles the values of the digits into a single number, and outputs the model ID.

The model ID checking unit 203 then searches the control program database storage unit 204 based on the model ID output from the model ID acquisition unit 202 for the control program and second header record combination that matches the value in the model ID block (step S109). Next, the model ID checking unit 203 evaluates the correlation between the model ID and second header record using the second method (step S110). If the model ID sent from the recording device 10 and the second header record that was found match, the control program writing unit 205 sends the control program for this second header record to the recording device 10 using a specific communication method, and rewrites the control program (step S111).

If the data sequence obtained by rearranging the first range model ID or the sequel report bit sequence contained in the response in a specific order does not match the first header record, an error is detected and writing is omitted.

If the second range model ID contained in the second response and the second header record do not match in step S110, an error is detected and writing is omitted.

The recording system 1 described above enables determining the correlation between model ID and control program for both devices to which a value in a first range of values that are currently used is assigned as the model ID, and devices to which a value in a second range that does not overlap the first range is assigned as the model ID, without needing to greatly change the configuration of devices to which a model ID in the first range is assigned.

Note that steps S101, S102, S104, S105, and S111 in the flow chart in FIG. 7 are executed for an old control program writing unit 205.

The effect of the invention is described below.

The recording system 1 uses values in a first range and values in a second range as model IDs. As a result, the number of model IDs can be increased a greater number of models can be accommodated compared with when only values in the first range are used as model IDs.

The first method and second method differ. As a result, as shown below, the correlation between the model ID and control program will not be mistakenly evaluated, and erroneously writing the control program to the recording device 10 can be prevented, regardless of the combination of old recording devices (recording devices with a model ID in the first range), new recording devices (recording devices with a model ID in the second range), old host devices (host devices that cannot execute the second method), and new host devices (host device 20).

If the recording device 10 has an old model ID in the first range, and the host is also an old model, the model ID in the first range is used for confirmation using the first method. As a result, the correlation can be appropriately determined based on the first header record. Rewriting is then done using the corresponding control program.

If the recording device 10 has an old model ID in the first range, and the host is a new model (host device 20), that the model ID is not the sequel report bit sequence will be recognized in step S103. Operation therefore proceeds to step S104, and the correlation is appropriately evaluated based on the model ID in the first range, the first method, and the first header record. Rewriting is then done using the corresponding control program.

If the recording device 10 has a model ID in the new second range, and the host is an old model, the host uses the sequel report bit sequence as the model ID, converts the sequel report bit sequence using the first method, and checks the correlation based on the bit sequence of the four blocks from the beginning of the second header record. In this case the order of the bit conversion of the blocks using the first method, and the order of the bit conversion of the blocks in the first area data recorded in the second header record, will differ. More specifically, in the example in FIG. 6, the bit-inverted bit sequence (left end block in FIG. 6A) and the 2-bit left circular shifted bit sequence (left end block in FIG. 6B) are compared. The 2-bit left circular shifted bit sequence (third block from left in FIG. 6A) and the bit-inverted bit sequence (third block from left in FIG. 6B) are compared. As a result, the bit sequences will always be different and will be determined to not match, and the control program will not be rewritten. An old host device can therefore be prevented from erroneously writing the control program to a recording device 10 with a model ID in the new second range.

If the recording device 10 has a model ID in the new second range, and the host is a new model (host device 20), the sequel report bit sequence will be recognized in step S103. The model ID in the second range is therefore checked using the second method. As a result, the correlation can be appropriately determined based on the second header record, and rewriting is then done using the corresponding control program.

OTHER EMBODIMENTS

The recording device 10 described above is one example of a peripheral device for which a host device 20 checks the correlation between model ID and a corresponding control program or data. However, the peripheral devices for which the host device 20 checks this correlation are not limited to recording devices. For example, the peripheral device could be a display device, communication device, auxiliary storage, or other type of device.

The bit conversion process of each block shown in FIG. 6 is also for example only, and the order and number of blocks are also for example only.

The model ID information of the recording device 10 to which a model ID in the second range is assigned could store a model ID expressed by character codes together with a model ID expressed by numbers. In this case, the control unit 104 does not need to convert the model ID from a numeric value to character codes when generating the second response information.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The entire disclosure of Japanese Patent Application No: 2011-81737, filed Apr. 1, 2011 is expressly incorporated by reference herein.

What is claimed is:

1. A method whereby a host device sends a control program to a recording device, the control program depending on a type of the recording device, the method comprising steps of:

requesting, by the host device, the recording device to send first information to the host device, the first information including recording device model identification or sequel information, wherein the recording device model identification includes the type of the recording device and is expressed as a value in a first range, and wherein the sequel information indicates that the recording device has a model identification that is a value in a second range that differs from values in the first range;

determining, by the host device, if the recording device model identification or the sequel information is contained in the first information received from the recording device, when the recording device model identification is contained in the first information, acquiring the recording device model identification from the first information when the sequel information is contained in the first information,
  requesting the recording device to send second information containing the recording device model identification expressed as a value in the second range, and
  acquiring the recording device model identification from the second information sent from the recording device; and
sending the control program from the host device to the recording device, the control program being associated with the type of the recording device included in the acquired recording device model identification.

2. The method described in claim 1, wherein:
after acquiring the recording device model information from the first information, the host device evaluates a correlation between the acquired model identification and the control program by a first method.

3. The method described in claim 2, wherein:
the first method converts model identification acquired from the first information to a first format, and
  evaluates a correlation between the converted information in the first format and information contained in the control program.

4. The method described in claim 3, wherein:
after acquiring the recording device model identification from the second information, the host device evaluates the correlation between the acquired model identification and the control program by a second method that differs from the first method.

5. The method described in claim 4, wherein:
the second information includes the sequel information; and
the second method converts the sequel information contained in the second information to a second format that differs from the first format, and
  evaluates a correlation between the converted information in the second format and information contained in the control program.

6. The method described in claim 5, wherein:
the first method and the second method are methods that determine if the result of a specific bit conversion is a specific value, and the result of bit conversion obtained in the first method, and the result of bit conversion obtained in the second method, are different methods.

7. The method described in claim 5, wherein:
the first method and the second method are methods that apply a plurality of bit conversions to received information, and confirm whether or not the value obtained by arranging results of the plural bit conversions in a specific order is a specific value, and the bit conversions or ordering sequences performed in the first method and the second method are different.

8. The method described in claim 3, further comprising a step of:
the host device sending the control program to the recording device based on the acquired recording device model identification when the converted information in the first format and the information contained in the control program match.

9. The method described in claim 5, further comprising a step of:
the host device sending the control program to the recording device based on the acquired recording device model identification when the converted information in the second format and the information contained in the control program match.

10. A device comprising:
a reception unit that receives, from a recording device, first information including recording device model identification or sequel information, wherein the recording device model identification includes type of the recording device and is expressed as a value in a first range, and wherein the sequel information indicates that the recording device has a model identification that is a value in a second range that differs from values in the first range;
a storage unit that stores control program corresponding to the recording device according to the recording device model identification;
a request unit that, when the sequel information is contained in the first information received by the reception unit, requests second information containing recording device model identification as a value in the second range from the recording device; and
a communication unit that sends the control program corresponding to the type of the recording device to the recording device, the control program being selected according to the recording device model identification contained in the first information or the recording device model identification contained in the second information.

11. The device described in claim 10, further comprising:
an evaluation unit that evaluates the correlation between the acquired model identification and the control program by a first method after acquiring the recording device model identification from the first information.

12. The device described in claim 11, wherein:
the first method converts recording device model identification acquired from the first information to a first format, and
  evaluates a correlation between the converted information in the first format and information contained in the control program.

13. The device described in claim 12, wherein:
the evaluation unit evaluates the correlation between the acquired recording device model identification and the control program by a second method that differs from the first method after acquiring the recording device model identification from the second information.

14. The device described in claim 13, wherein:
the second information includes the sequel information; and
the second method converts the sequel information contained in the second information to a second format that differs from the first format, and
  evaluates a correlation between the converted information in the second format and information contained in the control program.

15. The method of claim 2, wherein the first method produces a first header record, the first header record including a bit inversion, a two-bit right circular shift, a two-bit left circular shift, and the recording device model identification in the first range.

16. The method of claim 4, wherein the second method produces a second header record, the second header record including a first area data section and a second area data section, the first area data section including a bit inversion, a two-bit right circular shift, a two-bit left circular shift, a sequel report bit sequence in the first range, the second area data including the recording device model identification in the second range.

* * * * *